(12) United States Patent
Wang et al.

(10) Patent No.: US 9,444,109 B2
(45) Date of Patent: Sep. 13, 2016

(54) SYSTEM AND METHOD FOR SUPPLYING HYDROGEN GAS, AND HYDROGEN FUEL CELL SYSTEM

(71) Applicant: Huawei Technologies Co., Ltd., Shenzhen (CN)

(72) Inventors: Xingjie Wang, Shenzhen (CN); Haijun Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 695 days.

(21) Appl. No.: 13/800,385

(22) Filed: Mar. 13, 2013

(65) Prior Publication Data

US 2013/0202988 A1 Aug. 8, 2013

Related U.S. Application Data

(63) Continuation of application No. PCT/CN2011/075023, filed on May 31, 2011.

(30) Foreign Application Priority Data

Sep. 25, 2010 (CN) .......................... 2010 1 0293004

(51) Int. Cl.
*H01M 8/04* (2016.01)
*F17C 5/00* (2006.01)

(52) U.S. Cl.
CPC .......... *H01M 8/04089* (2013.01); *F17C 5/007* (2013.01); *H01M 8/04201* (2013.01); *Y02E 60/50* (2013.01); *Y02P 70/56* (2015.11)

(58) Field of Classification Search
CPC ................... H01M 8/04089; H01M 8/04201; Y02E 60/50
See application file for complete search history.

(56) References Cited

U.S. PATENT DOCUMENTS

2004/0066043 A1* 4/2004 Maiwald et al. ............... 290/43
2004/0258965 A1 12/2004 Christie et al.
(Continued)

FOREIGN PATENT DOCUMENTS

CN 1523134 A 8/2004
CN 2724213 Y 9/2005
(Continued)

OTHER PUBLICATIONS

Written Opinion of the International Searching Authority issued in corresponding PCT Patent Application No. PCT/CN2011/075023, mailed Aug. 25, 2011.
(Continued)

*Primary Examiner* — Ula C Ruddock
*Assistant Examiner* — Frank Chernow
(74) *Attorney, Agent, or Firm* — Brinks Gilson & Lione (57) ABSTRACT

A system and method for supplying hydrogen gas, and a hydrogen fuel cell system are provided to solve inconvenience caused by the requirement for replacing a hydrogen storage container during hydrogen gas supplement. The system for supplying hydrogen gas includes a hydrogen storage unit, a hydrogen conveying unit and a charging device connected to the hydrogen storage unit, where the charging device includes a charging opening matched with a hydrogen gas infusing unit. It may be noted that according to the solution provided by the embodiments of the present disclosure, when hydrogen gas needs to be supplemented, an external infusing device may be used to infuse hydrogen gas to the hydrogen storage container in the hydrogen storage unit through the charging opening, which avoids replacement of the hydrogen storage container during an entire infusing process, and makes an intensive hydrogen gas supplement process more convenient and faster.

9 Claims, 10 Drawing Sheets

(56) References Cited

U.S. PATENT DOCUMENTS

2008/0124594 A1    5/2008   Kim et al.
2009/0308489 A1   12/2009   Hirakata
2010/0167155 A1    7/2010   Kim et al.

FOREIGN PATENT DOCUMENTS

| | | |
|---|---|---|
| CN | 101355175 A | 1/2009 |
| CN | 101387370 A | 3/2009 |
| CN | 101390238 A | 3/2009 |
| CN | 101484743 A | 7/2009 |
| CN | 101832467 A | 9/2010 |
| CN | 101958423 A | 1/2011 |
| EP | 1267432 A2 | 12/2002 |
| JP | 2005069328 A | 3/2005 |

OTHER PUBLICATIONS

Office Action issued in corresponding Chinese Patent Application No. 201010293004.5, mailed Mar. 11, 2013.

Office Action issued in corresponding Chinese Patent Application No. 201010293004.5, mailed Feb. 24, 2012.

Office Action issued in corresponding Chinese Patent Application No. 201010293004.5, mailed Oct. 19, 2012.

International Search Report issued in corresponding PCT Patent Application No. PCT/CN2011/075023, mailed Aug. 25, 2011.

* cited by examiner

SYSTEM AND METHOD FOR SUPPLYING HYDROGEN GAS, AND HYDROGEN FUEL CELL SYSTEM

CROSS-REFERENCE TO RELATED APPLICATIONS

This application is a continuation of International Application No. PCT/CN2011/075023, filed on May 31, 2011, which claims priority to Chinese Patent Application No. 201010293004.5, filed on Sep. 25, 2010, both of which are hereby incorporated by reference in their entireties.

FIELD

The present disclosure relates to the gas supply field, and in particular, to a hydrogen supply system, a system and method for supplying hydrogen gas, and a hydrogen fuel cell system.

BACKGROUND

Figure 1:
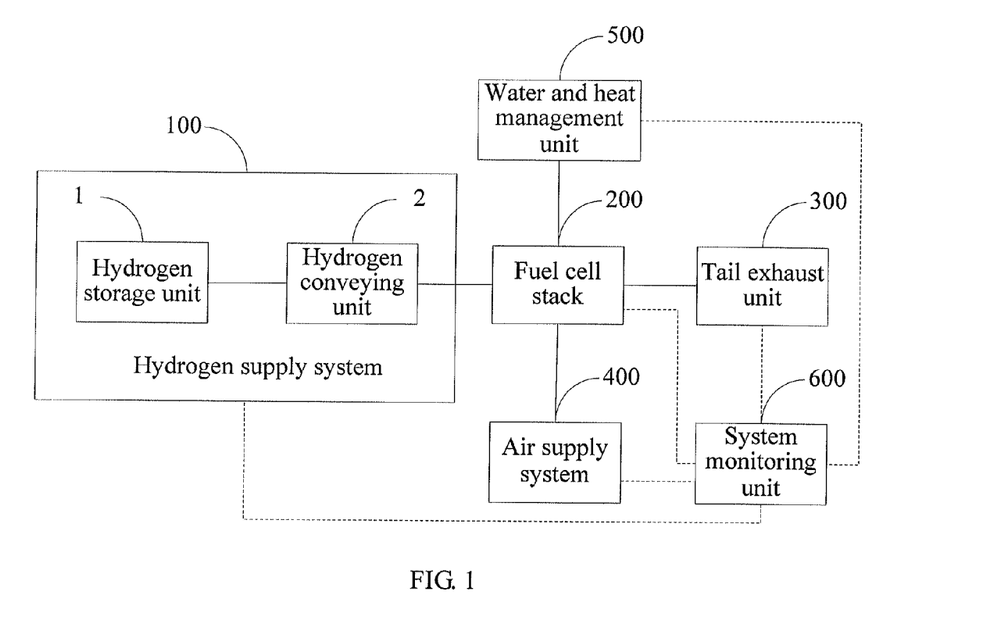
FIG. 1 is a schematic structural diagram of a hydrogen fuel cell system.

A hydrogen fuel cell system has features such as high efficiency and energy conservation, reliability and stability, strong environmental adaptability, and being green and environment-friendly, and is widely applied to fields such as automobile driving, a portable power source system, and a standby power source of a communication base station. Referring to FIG. 1, the hydrogen fuel cell system generally includes a hydrogen supply system 100, a fuel cell stack 200, a tail exhaust unit 300, an air supply system 400, a water and heat management unit 500, and a system monitoring unit 600. A working principle of the hydrogen fuel cell system is that the hydrogen supply system 100 supplies hydrogen gas (fuel) to the fuel cell stack 200, and the fuel cell stack 200 enables the hydrogen gas to have a chemical reaction with oxygen gas conveyed by the air supply system 400, so as to generate electric power, and generate water ($H_2O$) that is exhausted by the tail exhaust unit 300. The water and heat management unit 500 is responsible for the water and heat cycle of an entire hydrogen fuel cell system, and especially the water and heat cycle of the fuel cell stack 200 therein, so that the fuel cell stack 200 works in a normal temperature range. The system monitoring unit 600 is configured to detect working indexes (such as temperature, pressure and power) of the entire hydrogen fuel cell system, and perform corresponding control according to a detection result, so as to ensure that each part of the system works in coordination.

The above hydrogen supply system 100 further includes a hydrogen storage unit 1 for storing hydrogen gas and a hydrogen conveying unit 2 for supplying hydrogen gas to the fuel cell stack 200. The hydrogen storage unit 1 and the hydrogen conveying unit 2 may include different components because application fields differ. An application in the standby power source of the communication base station is taken as an example. The hydrogen storage unit 1 therein includes a high pressure busbar and one or multiple hydrogen storage containers (usually multiple). Hydrogen gas in the hydrogen storage container enters the hydrogen conveying unit 2 after being converged through the high pressure busbar, and the hydrogen conveying unit 2 supplies the hydrogen gas to the fuel cell stack 200.

However, during the implementation of the present disclosure, the inventor finds that, when the hydrogen gas needs to be supplemented, a conventional method is to replace the hydrogen storage container. The hydrogen storage container is heavy and therefore very inconvenient to be moved, which brings inconvenience to hydrogen gas supplement. Other application fields of the hydrogen fuel cell system are also faced with the inconvenience caused by the requirement for replacing the hydrogen storage container in the hydrogen storage unit.

SUMMARY

In view of this, an objective of embodiments of the present disclosure is to provide a hydrogen supply system, a system and method for supplying hydrogen gas, and a hydrogen fuel cell system, so as to solve inconvenience caused by the requirement for replacing a hydrogen storage container during hydrogen gas supplement.

In order to achieve the above objective, the embodiments of the present disclosure provide the following solution:

According to an aspect of the embodiments of the present disclosure, a hydrogen supply system is provided, including a hydrogen storage unit, a hydrogen conveying unit, and a charging device connected to the hydrogen storage unit, where the charging device includes a charging opening matched with an external infusing device.

According to another aspect of the embodiments of the present disclosure, a system for supplying hydrogen gas is provided, including a hydrogen gas infusing unit and a hydrogen supply system, where: the hydrogen supply system includes a hydrogen storage unit, a hydrogen conveying unit and a charging device connected to the hydrogen storage unit, and the charging device includes a charging opening; and the hydrogen gas infusing unit includes an infusing device matched with the charging opening.

According to still another aspect of the embodiments of the present disclosure, a method for supplying hydrogen gas is provided and based on the above hydrogen supply system, including: infusing hydrogen gas to the hydrogen supply system by using an external infusing device.

It may be seen from the above solution that, when hydrogen gas needs to be supplemented, the solution provided in the embodiments of the present disclosure may use the external infusing device to infuse hydrogen gas to the hydrogen storage container in the hydrogen storage unit through the charging opening, which avoids replacement of the hydrogen storage container during an entire infusing period, making an intensive hydrogen gas supplement process convenient and fast.

BRIEF DESCRIPTION OF THE DRAWINGS

To illustrate the solutions according to the embodiments of the present disclosure or in the prior art more clearly, the accompanying drawings needed for describing the embodiments or the prior art are introduced below briefly. Apparently, the accompanying drawings in the following descriptions merely show some of the embodiments of the present disclosure, and persons skilled in the art may obtain other drawings according to the accompanying drawings without creative efforts.

DETAILED DESCRIPTION OF THE EMBODIMENTS

The solutions of the present disclosure are to be clearly described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

A hydrogen fuel cell system has features such as high efficiency and energy conservation, reliability and stability, strong environmental adaptability, and being green and environment-friendly, and is widely applied to fields such as automobile driving, a portable power source system, and a standby power source of a communication base station.

A hydrogen supply system in a hydrogen fuel cell system generally includes a hydrogen storage unit and a hydrogen conveying unit. However, during the implementation of the present disclosure, the inventors find that, when the hydrogen gas needs to be supplemented, a conventional method is to replace the hydrogen storage container in the hydrogen storage unit, which makes the hydrogen gas supplement inconvenient.

Figure 2:
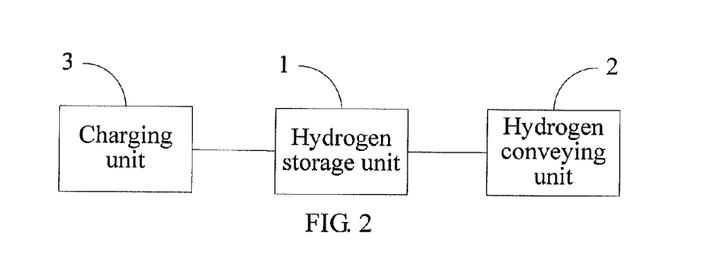
FIG. 2 is a schematic structural diagram of a hydrogen supply system provided in an embodiment of the present disclosure.

In order to solve the above problem, an embodiment of the present disclosure provides a hydrogen supply system. FIG. 2 shows a structure of the hydrogen supply system, including: a hydrogen storage unit 1, a hydrogen conveying unit 2, and a charging device connected to the hydrogen storage unit 1, where the charging device includes a charging opening matched with an external infusing device. The charging device is a main constituent part of a charging unit 3. A composition structure of the charging unit 3 is described in detail in the subsequent embodiment of the present disclosure.

It may be seen that, in the embodiment of the present disclosure, when hydrogen gas needs to be supplemented, the external infusing device may be used to infuse hydrogen gas to the hydrogen storage container in the hydrogen storage unit through the charging opening, which avoids replacement of the hydrogen storage container during an entire infusing period, making an intensive hydrogen gas supplement process convenient and fast.

The solution of the present disclosure is illustrated in the following by taking a standby power source of a communication base station as an application scenario (in the following description of this specification, the standby power source of a communication base station is taken as the application scenario unless otherwise specified).

Figure 3:
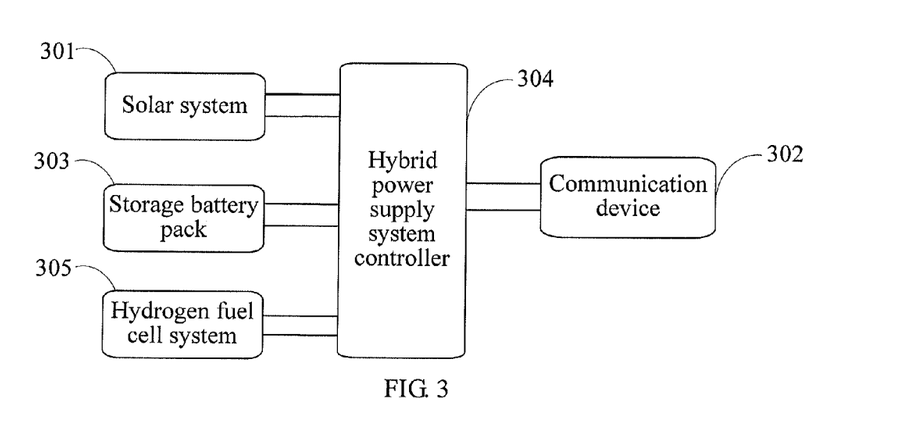
FIG. 3 is a schematic diagram of a photo-hydrogen hybrid power supply manner provided in an embodiment of the present disclosure.

Referring to FIG. 3, a communication base station, especially a communication base station at a remote site, usually adopts a photo-hydrogen hybrid power supply manner to provide a standby power source for a communication device. A working principle of the photo-hydrogen hybrid power supply manner is that, a solar system 301 serves as a major source of energy; when it is sunny, the solar system 301 supplies power to a communication device 302 in one aspect, and in another aspect, charges a storage battery 303. When there is no sunshine, the storage battery 303 supplies power to the communication device 302. In continuous overcast and rainy days, after a discharge capacity of the storage battery 303 exceeds a set value, a hybrid power supply system controller 304 sends an instruction to control a hydrogen fuel cell system 305 so that the hydrogen fuel cell system 305 starts, so as to supply power to the communication device 302 and additionally charges the storage battery 303 at the same time. The above manner combines a pure green feature of the solar system and advantages of the hydrogen fuel cell system, solving a continuous power supply problem of an off-grid site very well.

Figure 4:
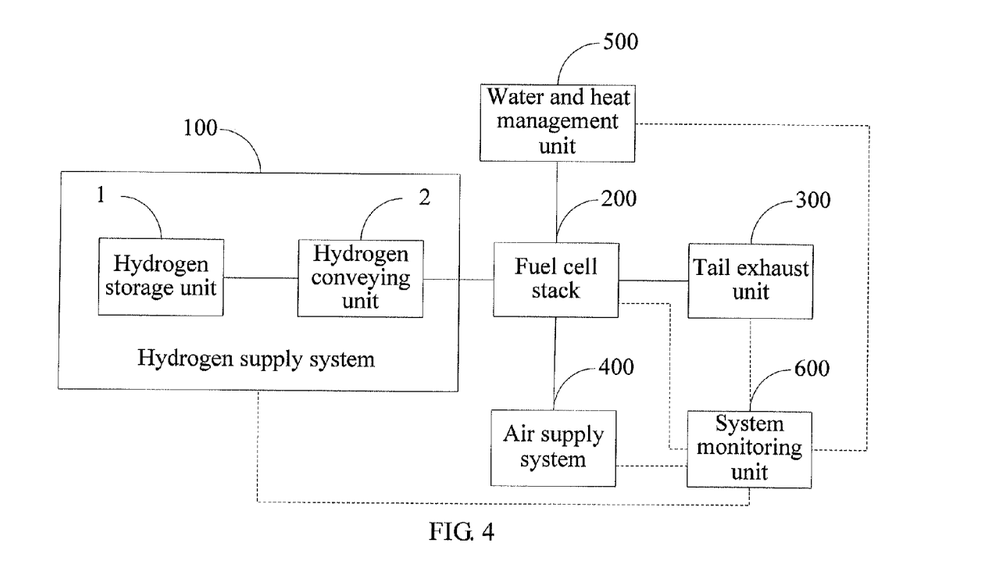
FIG. 4 is a schematic structural diagram of a hydrogen fuel cell system provided in an embodiment of the present disclosure.
Figure 5:
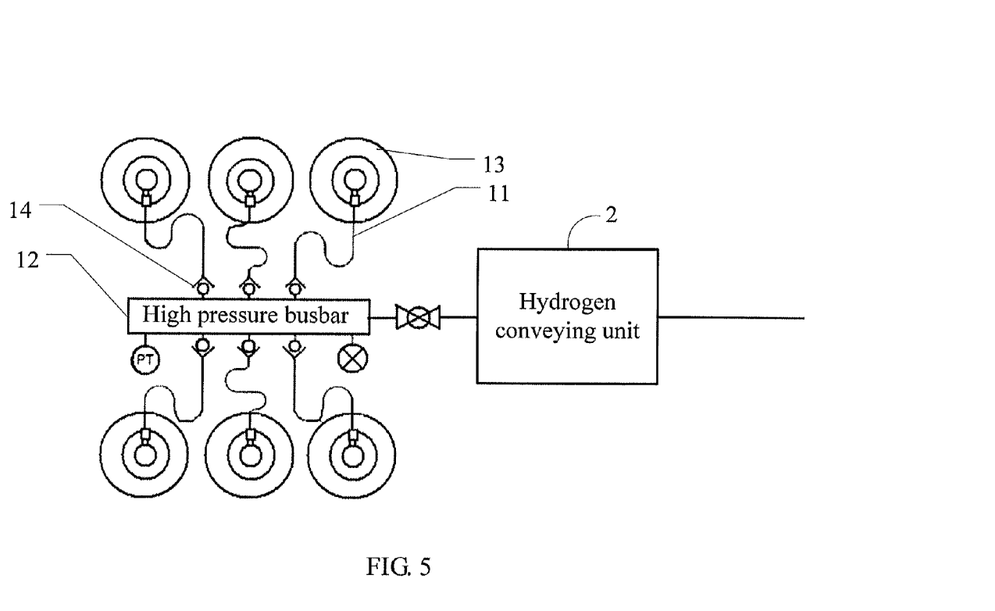
FIG. 5 is another schematic structural diagram of a hydrogen supply system provided in an embodiment of the present disclosure.

Referring to FIG. 4 and FIG. 5, the above hydrogen fuel cell system 305 includes a hydrogen supply system 100, a fuel cell stack 200, a tail exhaust unit 300, an air supply system 400, a water and heat management unit 500 and a system monitoring unit 600. Once the previous hybrid power supply system controller 304 sends the instruction that requires the hydrogen fuel cell system to output electric power, the hydrogen supply system 100 starts and supplies hydrogen gas to the fuel cell stack 200. Water generated in the fuel cell stack 200 is exhausted by the tail exhaust unit 300. In addition, the water and heat management unit 500 is responsible for a water and heat cycle of the entire hydrogen fuel cell system 305, especially, the fuel cell stack 200 in the hydrogen fuel cell system 305 (for example, when an environment temperature is lower than 0° C., the fuel cell stack 200 is heated up, so as to ensure normal startup of the fuel cell stack 200), so that the fuel cell stack 200 works in a normal temperature range (generally being 40 to 50° C., and not exceeding 70° C. at most). The system monitoring unit 600 is configured to detect working indexes (such as temperature and pressure) of the entire hydrogen fuel cell system 305, and perform corresponding control according to a detection result, so as to ensure that each part of the system work in coordination.

The conventional hydrogen supply system 100 includes a hydrogen storage unit 1 and a hydrogen conveying unit 2. The hydrogen storage unit 1 further includes a high pressure busbar 12 and multiple hydrogen storage containers 13 (which are generally hydrogen storage steel cylinders, carbon fiber bottles, metal hydrogen storage containers and so on), where the high pressure busbar 12 and multiple hydrogen storage containers 13 are connected through metal hoses 11. A one-way valve 14 is further disposed between a hydrogen storage container 13 and the high pressure busbar 12. Under the effect of the one-way valves 14, hydrogen gas in the hydrogen storage containers 13 can only flows to the high pressure busbar 12 in a one-way manner, and enters the hydrogen conveying unit 2 after being converged through the high pressure busbar 12. In addition, hydrogen gas supplement for a conventional hydrogen storage unit is implemented by replacing the hydrogen storage container 13. Therefore, during the replacement of the hydrogen storage container 13, the one-way valve 14 may function to prevent the hydrogen gas in the high pressure busbar 12 from leaking from the metal hose 11.

In a general case, when a pressure in the hydrogen storage container is less than 3 MPa, hydrogen gas needs to be supplemented. In conventional hydrogen gas supplement, a conventional gas supplier transports a hydrogen storage container filled with hydrogen gas to the base station through transportation means, to replace a hydrogen storage container short of pressure in the base station, and carries away the hydrogen storage container that has been replaced. The hydrogen storage container is heavy and therefore very inconvenient to be moved, which brings inconvenience to hydrogen gas supplement. In addition, communication base stations are characterized by being dispersed locally but centralized regionally. After a photo-hydrogen hybrid power supply system is applied in small batches, if the manner of replacing the hydrogen storage container is further adopted, it is uneconomic in consideration of costs.

Figure 6:
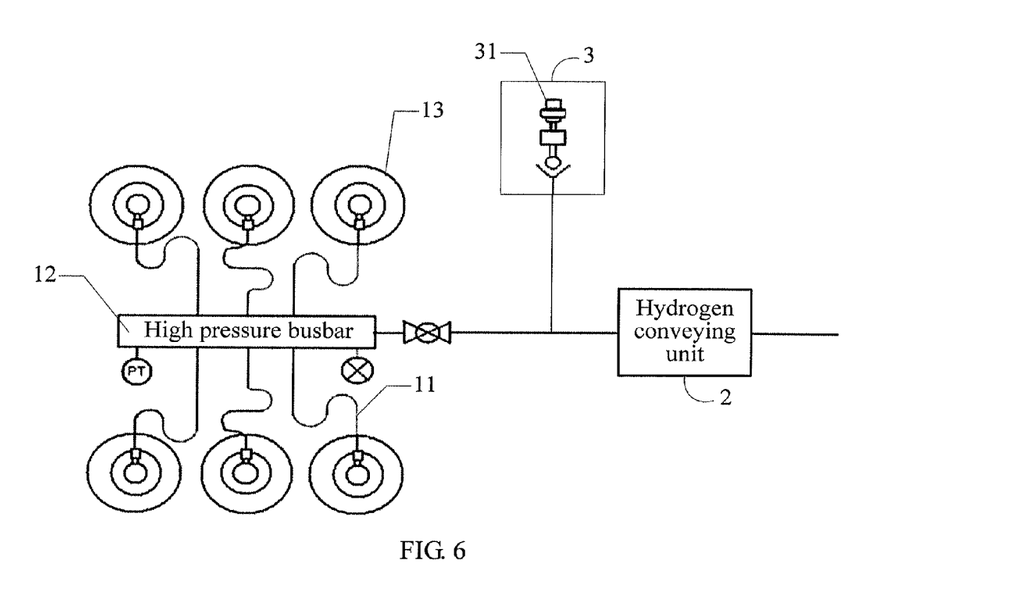
FIG. 6 is still another schematic structural diagram of a hydrogen supply system provided in an embodiment of the present disclosure.

In order to solve the above problem, referring to FIG. 6, an embodiment of the present disclosure introduces a charging unit 3 to the conventional hydrogen supply system 100, where the charging unit 3 at least includes a charging device having a charging opening 31, and the charging device is connected to the high pressure busbar 12.

Meanwhile, the embodiment of the present disclosure further introduces a hydrogen gas infusing unit to form a system for supplying hydrogen gas together with the hydrogen supply system having the charging unit 3 according to any one of the above embodiments. The hydrogen gas infusing unit includes an infusing device matched with the charging opening 31. During a specific implementation, the above infusing device may be an infusing gun, or other apparatuses capable of performing infusion.

In this manner, when hydrogen gas needs to be supplemented, the infusing gun may be inserted into the charging opening 31 to infuse hydrogen gas to the hydrogen storage container 13, and after infusion is completed, the infusing gun is pulled out. The charging device may have a one-way conduction function, so as to ensure that the hydrogen gas can only be infused from the infusing gun to the charging opening 31, and cannot escape from the charging opening 31.

It may be seen from the above that, by adopting the solution provided in the embodiment, the hydrogen storage container 13 does not need to be moved during an infusing period, which makes the hydrogen gas supplement process convenient and fast. In addition, because the hydrogen storage container 13 does not need to be replaced, the one-way valve 14 as shown in FIG. 5 does not need to be disposed between the hydrogen storage container 13 and the high pressure busbar 12. The one-way valve is expensive, and therefore, in terms of costs, the solution provided in the embodiment also has an advantage.

Figure 7:
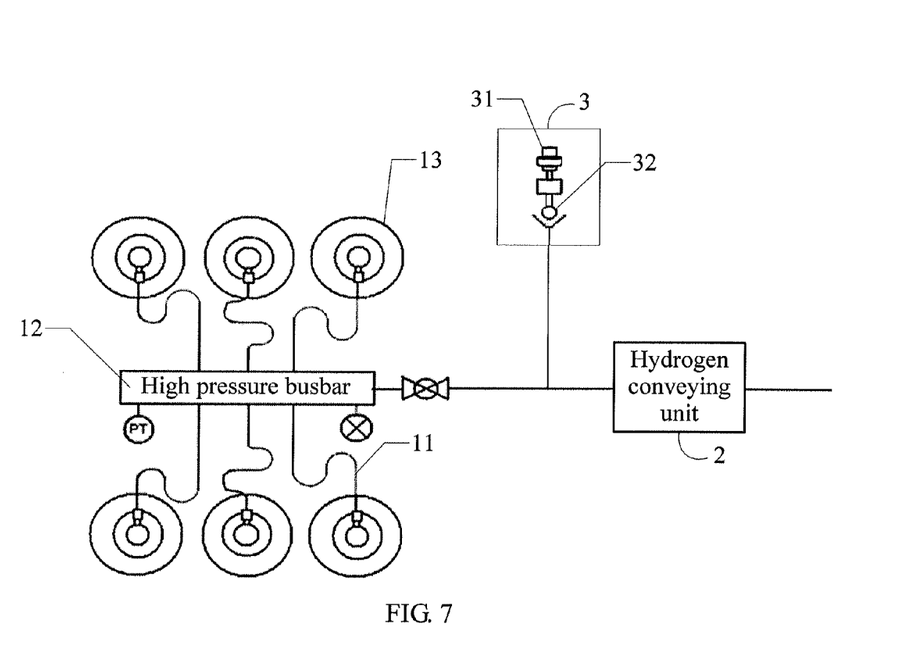
FIG. 7 is still another schematic structural diagram of a hydrogen supply system provided in an embodiment of the present disclosure.

In another embodiment of the present disclosure, referring to FIG. 7, the above charging unit 3 may further include a one-way valve 32, where one end of the one-way valve 32 is connected to the charging device, and the other end is connected to the high pressure busbar 12. The one-way valve 32 may also prevent hydrogen gas from flowing from the high pressure busbar 12 to the charging opening 31. Therefore, in this embodiment, the charging device may or may not have the one-way conduction function.

Figure 8:
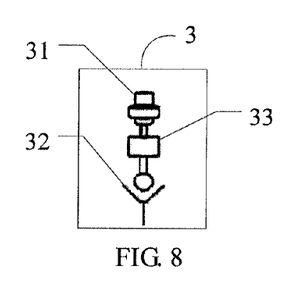
FIG. 8 is a schematic structural diagram of a charging unit provided in an embodiment of the present disclosure.

In another embodiment of the present disclosure, referring to FIG. 8, the charging device in the charging unit 3 may further include a buffer chamber 33 in communication with the charging opening 31. Meanwhile, the buffer chamber 33 is further connected to the one-way valve 32 (definitely, if the charging device has the one-way conduction function, the one-way valve 32 may not be used). The buffer chamber 33 may function to reduce a hydrogen gas infusing velocity, so as to avoid an excessively high hydrogen gas temperature caused by severe friction between the hydrogen gas with an excessively fast flow rate and each part of the system for supplying hydrogen gas.

Figure 9:
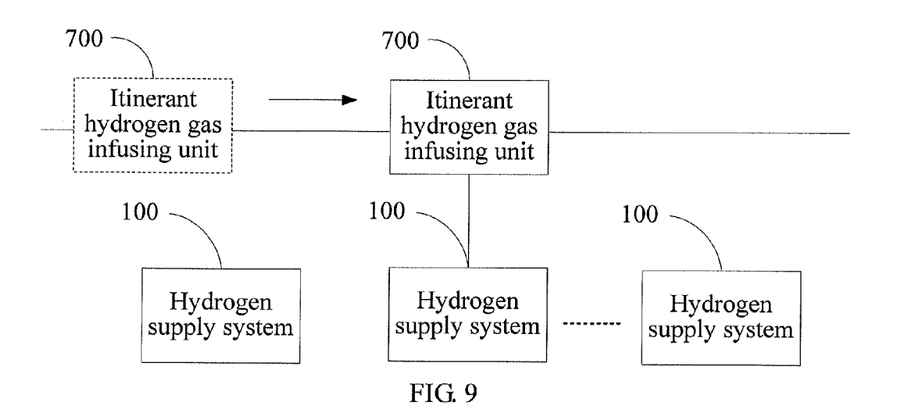
FIG. 9 is a schematic structural diagram of a system for supplying hydrogen gas provided in an embodiment of the present disclosure.

In order to further reduce operating costs, in other embodiments of the present disclosure, referring to FIG. 9, in some regions where base stations are relatively centralized, the above system for supplying hydrogen gas may include multiple hydrogen supply systems 100 and at least one itinerant hydrogen gas infusing unit 700. The itinerant hydrogen gas infusing unit 700 may move itinerantly, and when a hydrogen supply system 100 needs hydrogen gas supplement, the itinerant hydrogen gas infusing unit 700 moves to a place where the hydrogen supply system 100 is located, and performs infusion through an infusing gun or other infusing apparatuses. Definitely, multiple itinerant hydrogen gas infusing units 700 may be equipped in one system for supplying hydrogen gas, where each itinerant hydrogen gas infusing unit 700 provides hydrogen gas to one or some certain hydrogen supply systems 100 fixedly. Persons skilled in the art may design flexibly according to practical conditions, so as to reduce the transportation cost by a maximum degree. In addition, during the specific implementation, the itinerant hydrogen gas infusing unit 700 may be a hydrogen gas infusing vehicle with an infusing device. Hydrogen gas provided by the hydrogen gas infusing vehicle may be stored in the hydrogen gas infusing vehicle beforehand or may be generated by the hydrogen gas infusing vehicle through onsite reforming for hydrogen production.

In addition, apart from being connected to the high pressure busbar 12, the charging unit 3 in all the above embodiments may also be mounted on any one of the hydrogen storage containers 13. Alternatively, each hydrogen storage container 13 is mounted with a charging unit 3, and likewise, hydrogen gas infusion may be implemented by an infusing gun. Meanwhile, because the constituent parts included in the hydrogen storage unit vary in different application fields, a connection relationship between the charging unit and one or some constituent parts in the hydrogen storage unit also changes accordingly, which is not described in detail here, as long as the connection relationship ensures that the infusing device can infuse hydrogen gas into the hydrogen storage container through the charging unit.

Figure 10:
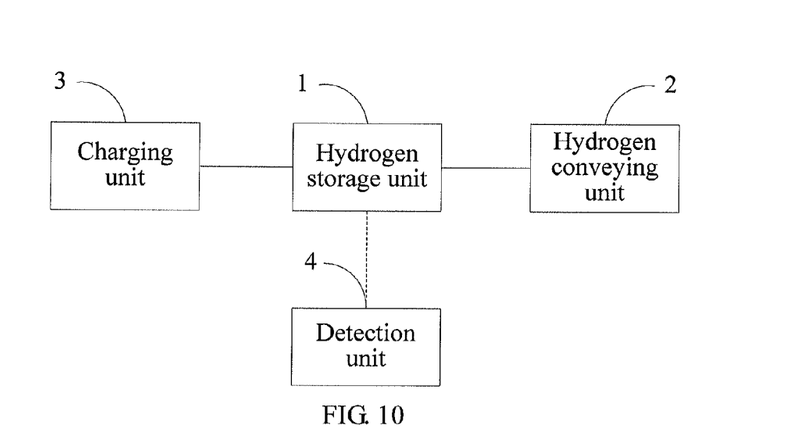
FIG. 10 is still another schematic structural diagram of a hydrogen supply system provided in an embodiment of the present disclosure.

In order to further improve safety during an infusing process, a detection unit may be introduced to the system for supplying hydrogen gas or the hydrogen supply system in all the above embodiments. FIG. 10 shows a structure of a hydrogen supply system that has a detection unit 4. The detection unit 4 may include at least one of a pressure gauge, a pressure sensor, a thermometer, a temperature sensor and a hydrogen gas concentration sensor. Definitely, the detection unit 4 is not limited to merely including the devices listed above, and other detection devices may be added according to practical conditions and requirements, which is not described in detail here.

In an embodiment of the present disclosure, the high pressure busbar 12 in all the above embodiments may be disposed with a pressure gauge and a thermometer, so that infusion personnel may directly obtain a pressure and temperature in the high pressure busbar. The infusion personnel stop the infusion when a pressure value displayed on the pressure gauge reaches a maximum pressure limiting value, or when a temperature displayed on the thermometer is greater than a threshold, suspend the infusion and continues infusion after the temperature declines.

In other embodiments of the present disclosure, a pressure sensor and a temperature sensor may also be mounted on the high pressure busbar 12, and an infusion control subunit may be introduced to the itinerant hydrogen gas infusing unit 700. The infusion control subunit controls the infusing gun so that the infusing gun stops infusion when a pressure value collected by the pressure sensor is equal to a maximum pressure limiting value, or controls the infusing gun so that the infusing gun stops infusion when a temperature value collected by the temperature sensor is greater than a threshold and controls the infusion gun so that the confusing gun continues infusion after the temperature declines, until the pressure value collected by the pressure sensor is equal to the maximum pressure limiting value or the temperature value collected by the temperature sensor is greater than a threshold. Definitely, if the infusing gun and the charging opening are reasonably designed, so that the hydrogen gas infusing velocity is controlled in a certain range and thus the temperature in the high pressure busbar 12 does not rise to the above temperature threshold, the temperature sensor may not be used. In the same manner, in such a situation of the above embodiment, the thermometer may not be disposed on the high pressure busbar 12 either.

Considering a problem of potential hydrogen gas leak, in order to further improve the safety, a hydrogen gas concentration sensor may be introduced to all the above embodiments, so that when the hydrogen gas concentration is abnormal, the infusion control subunit may make corresponding processing, for example, suspending infusion.

The detection unit and the infusion control subunit may form a simplest infusion monitoring unit in the system for supplying hydrogen gas. It should be noted that, constituent parts included in the hydrogen storage unit vary in different fields. Therefore, persons skilled in the art may understand that, the detection devices in the detection unit are not merely limited to being disposed on the high pressure busbar, and may also be disposed on other parts. In addition, because the infusion control subunit and the sensor that is in the above detection unit are disposed at different locations data collected by the sensor may be directly transmitted to the infusion control subunit in a wireless manner, or may be transmitted to the above infusion control subunit through some execution devices in a wired manner. Persons of ordinary skills in the art may design flexibly according to existing communication technologies, which is not described in detail here.

Figure 11:
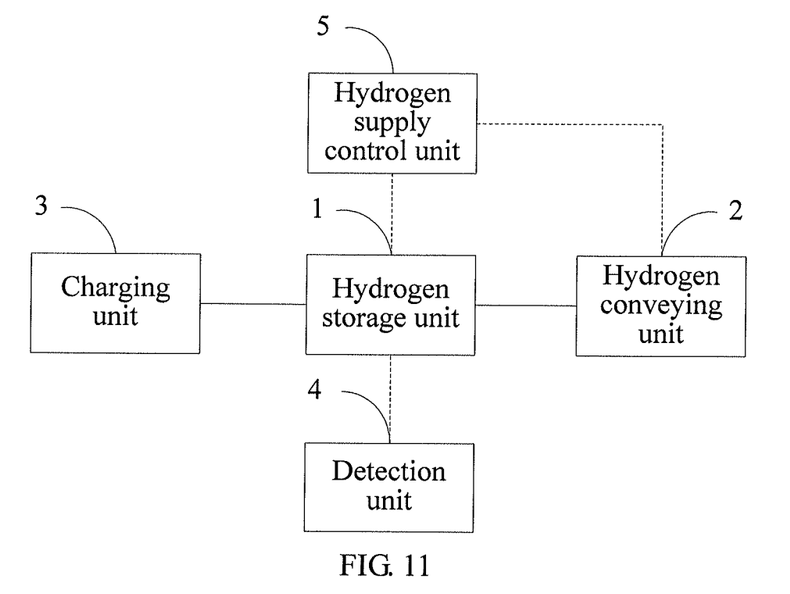
FIG. 11 is still another schematic structural diagram of a hydrogen supply system provided in an embodiment of the present disclosure.

Further, referring to FIG. 11, the above hydrogen supply system 100 may be further added with a hydrogen supply control unit 5 configured to perform corresponding control according to a received external command (for example, a command sent by the system for supplying hydrogen gas or hydrogen fuel cell system) or detection data of the detection unit 4. The above detection unit 4 and the hydrogen supply control unit 5 may form a simplest hydrogen supply monitoring unit. In addition, the monitoring of the hydrogen supply monitoring unit on the hydrogen supply system 100 may not be merely limited to the hydrogen gas infusing process. For example, corresponding control may be performed on each constituent unit/device of the hydrogen supply system 100 when the hydrogen supply system 100 is in a running state (that is, when supplying hydrogen gas to the above fuel cell stack 200), so as to guarantee normal operation of the system. In the same manner, the detection devices in the detection unit 4 are not limited to detecting the devices in the hydrogen storage unit. Persons skilled in the art may perform disposing flexibly according to practical requirements, which is not described in detail here again one by one.

In other embodiments of the present disclosure, the above hydrogen supply monitoring unit may further include at least one of an onsite alarming unit, an onsite emergency response unit and a remote communication alarming unit. Correspondingly, when the onsite alarming unit exists, the hydrogen supply control unit 5 includes an alarming control subunit for controlling the onsite alarming unit so that the onsite alarming unit performs alarming; when the onsite emergency response unit exists, the hydrogen supply control unit 5 includes an emergency response control subunit for controlling the onsite emergency response unit so that the onsite emergency response unit performs emergency response; when the remote communication alarming unit exists, the hydrogen supply control unit 5 includes a remote communication control subunit for controlling the remote communication alarming unit so that the remote communication alarming unit sends an alarming situation notification.

The onsite alarming unit may include one or multiple alarming devices such as an audible and visual alarm and a buzzer. The alarming device is generally disposed in the communication base station, so as to alarm and notify persons in or near the communication base station. The remote communication alarming unit is mainly configured to implement notifying of a remote alarming situation, for example, in some regions where base stations are relatively centralized, a separate maintenance center may be set to maintain each base station in a region administrated by the maintenance center. In this case, the remote communication alarming unit may send an alarming situation to the maintenance center, and personnel in the maintenance center make judgment and processing according to the alarming situation, and if necessary, maintenance personnel are dispatched to the communication base station for processing. When no maintenance center is set, the remote communication alarming unit may send the alarming situation to the maintenance personnel through a short message, and the maintenance personnel make judgment and processing according to the alarming situation.

During the specific implementation, the remote communication alarming unit may communicate with the outside in a wireless or wired manner. When communicating with the outside in a wireless manner, the remote communication alarming unit may be a wireless terminal transmitting information through 2G (such as GSM network and CDMA network) or 3G. As for situations that need alarming situation notification or emergency response, the present disclosure is to provide description in the following embodiments.

It should be noted that, the hydrogen supply monitoring unit may be independent of the aforementioned system monitoring unit 600, or may be a logic/physical constituent part of the system monitoring unit 600. The control function of the hydrogen supply control unit 5 may be implemented by electronic hardware, computer software, or a combination of the two. Whether these functions are executed in a hardware or software manner depends upon the particular application and design constraint conditions of the solution. For each specific application, persons skilled in the art may use a different method to implement the described functions, but the implementation should not be construed as beyond the scope of the present disclosure.

Figure 12:
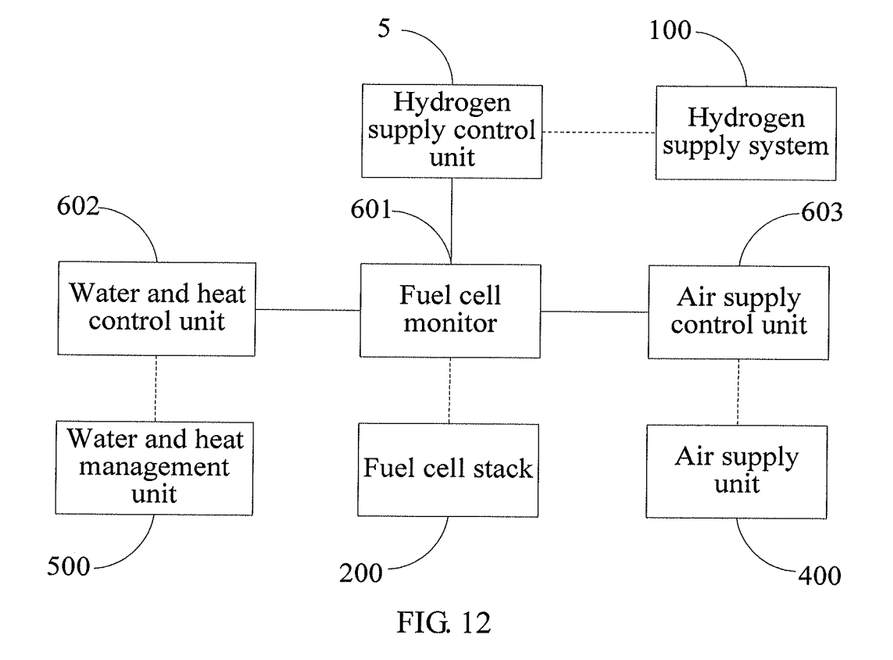
FIG. 12 is a schematic structural diagram of a system monitoring unit provided in an embodiment of the present disclosure.

|Here that the hydrogen supply monitoring unit belongs to the system monitoring unit 600 is taken as an example for introduction. Referring to FIG. 12, a control part of the system monitoring unit 600 mainly includes a hydrogen supply control unit 5, a fuel cell monitor 601, a water and heat control unit 602, and an air supply control unit 603, which are configured to control the hydrogen supply system 100, the fuel cell stack 200, the water and heat management unit 500 and the air supply system 400 respectively, and the fuel cell monitor 601 is a master controller of the hydrogen fuel cell system. The hydrogen supply control unit 5, the fuel cell monitor 601, the water and heat control unit 602 and the air supply control unit 603 may share the detection unit (device)/onsite alarming unit (device)/onsite emergency response unit (device) according to practical conditions, and may also have respective detection units (devices)/onsite alarming units (devices)/onsite emergency response units (devices) which are independent of each other.

Figure 13:
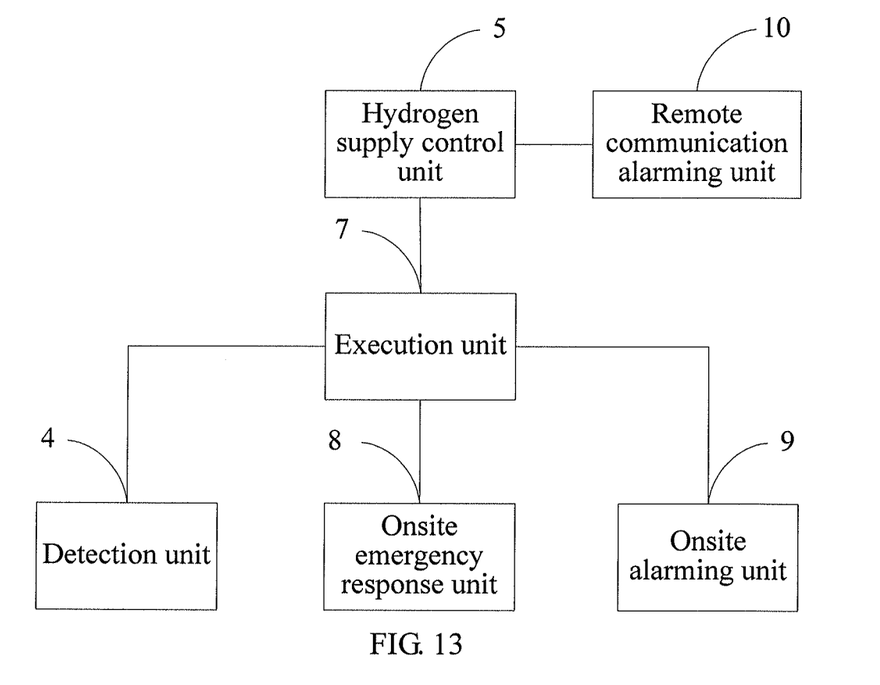
FIG. 13 is a schematic structural diagram of a hydrogen supply monitoring unit provided in an embodiment of the present disclosure.

Referring to FIG. 13, the above hydrogen supply monitoring unit includes a detection unit 4, a hydrogen supply control unit 5, an execution unit 7, an onsite emergency response unit 8, an onsite alarming unit 9 and a remote communication alarming unit 10. The detection unit 4 includes a pressure sensor and a hydrogen gas concentration sensor. The onsite emergency response unit 8 includes an emergency ventilation apparatus, a pressure relief valve and an evacuation pipe. A working principle of each unit is described as follows:

The hydrogen supply control unit 5 implements communication with the outside through the remote communication alarming unit 10.

The detection unit 4, the onsite emergency response unit 8, the onsite alarming unit 9 and some other devices are directly administrated/controlled by the execution unit 7. The execution unit 7 has a communication interface, and can communicate with the hydrogen supply control unit 5 and receive a command sent by the hydrogen supply control unit 5, to execute operations on a corresponding device according to the command sent by the hydrogen supply control unit 5.

The execution unit 7 uploads detection data collected by the pressure sensor and the hydrogen gas concentration sensor to the hydrogen supply control unit 5, and the hydrogen supply control unit 5 makes corresponding judgment according to the detection data, and sends a command to the execution unit 7 and/or the remote communication alarming unit 10. The unit that receives the command may perform a corresponding operation according to a related command. For example, the execution unit 7 may control the start and stop of the emergency ventilation apparatus, the pressure relief valve or other devices according to the command.

The solution of the present disclosure is described through a more specific example below.

Figure 14:
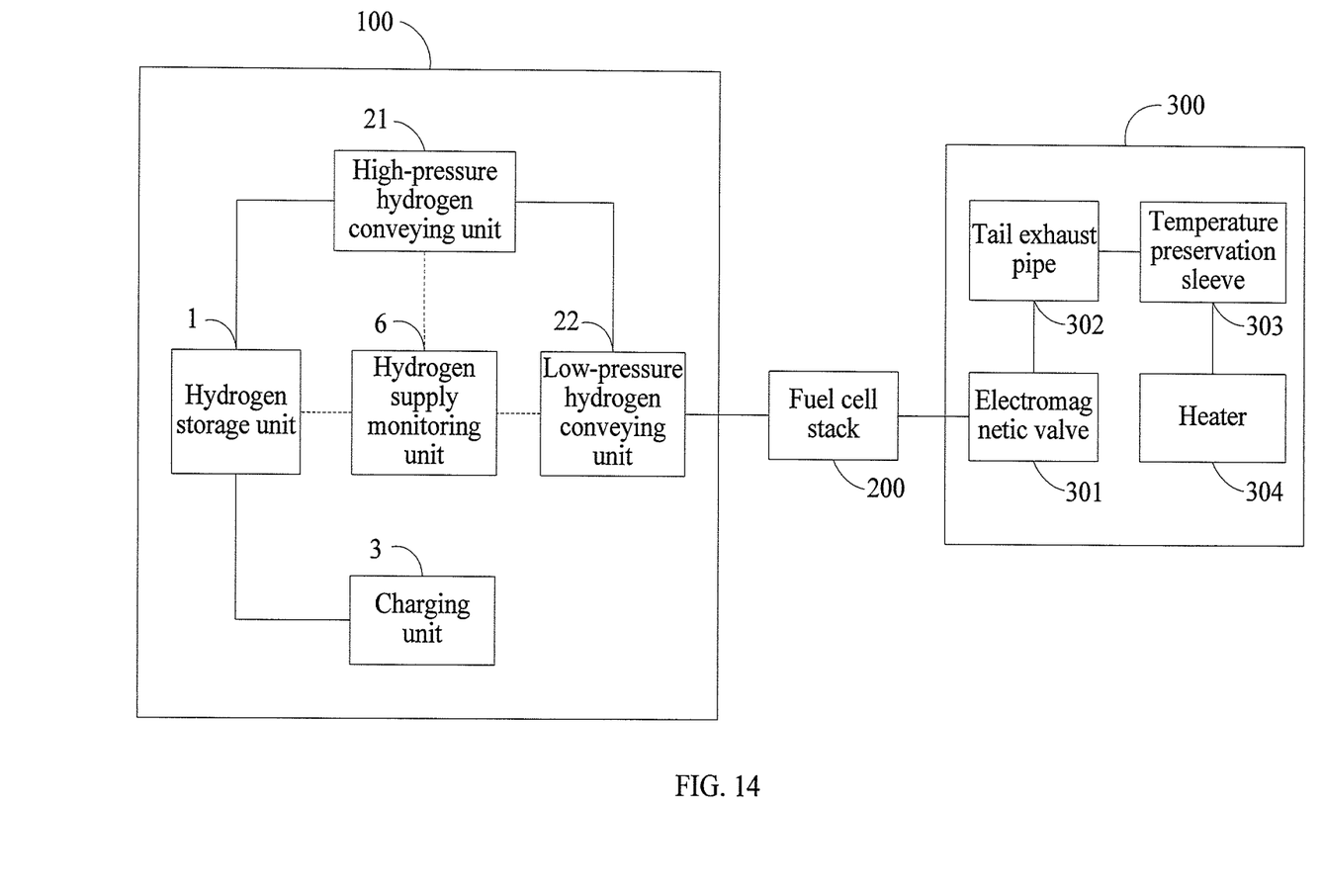
FIG. 14 is another schematic structural diagram of a hydrogen fuel cell system provided in an embodiment of the present disclosure.
Figure 15:
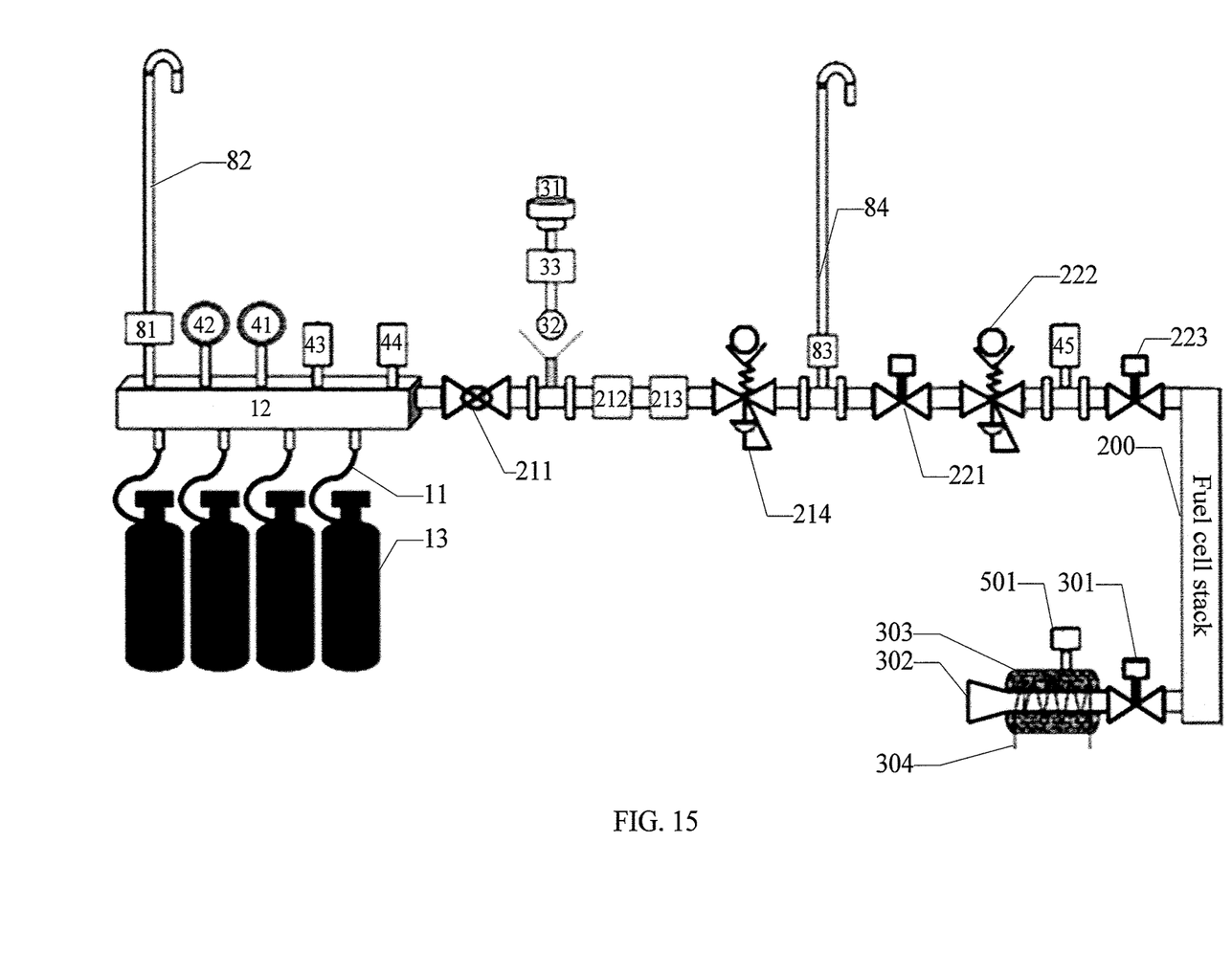
FIG. 15 is a schematic structural diagram of components of a hydrogen fuel cell system provided in an embodiment of the present disclosure.

FIG. 14 and FIG. 15 show a structure of a hydrogen fuel cell system, including: a hydrogen supply system 100, a fuel cell stack 200, a tail exhaust unit 300, an air supply unit, a water and heat management unit and a system monitoring unit.

The hydrogen storage unit 1 further includes a high pressure busbar 12 and multiple hydrogen storage containers 13 (which are generally hydrogen storage steel cylinders, carbon fiber bottles, metal hydrogen storage containers and so on), where the high pressure busbar 12 and multiple hydrogen storage containers 13 are connected through metal hoses 11. The hydrogen supply system 100 includes a hydrogen storage unit 1, a hydrogen conveying unit 2, a charging unit 3 and a hydrogen supply monitoring unit 6. The hydrogen storage unit 1 further includes a high pressure busbar 12 and multiple hydrogen storage containers 13, where the high pressure busbar 12 and multiple hydrogen storage containers 13 are connected through metal hoses 11. (in this system, a maximum limiting value of a pressure in the hydrogen storage container 13 is 13 MPa, and a pressure that the metal hose 11 can bear exceeds 20 MPa).

The hydrogen conveying unit 2 includes a high-pressure hydrogen conveying unit 21 and a low-pressure hydrogen conveying unit 22, where the high-pressure hydrogen conveying unit 21 is mainly formed by a manual ball valve 211 (the manual ball valve 211 may function to make hydrogen gas on/off, and is configured to seal the pipeline in an emergency, before mounting or during overhaul), an overflow valve 212 (configured to control a gas velocity), a filter 213 (configured to filter solid impurities in the gas), and a first-stage pressure reducing valve 214 (the first-stage pressure reducing valve 214 may covert the pressure of the gas from maximum 13 MPa to 0.4-0.5 MPa directly), which are connected in sequence, and related pipelines. The low-pressure hydrogen conveying unit 22 is formed by an electromagnetic valve 221, a second-stage pressure reducing valve 222 and an electromagnetic valve 223, which are connected in sequence, and related pipelines. The electromagnetic valve 221 is connected to an output end of the first-stage pressure reducing valve 214, and may prevent high-pressure gas from further advancing when the first-stage pressure reducing valve 214 is ineffective, so as to avoid damage to the second-stage pressure reducing valve 222. The second-stage pressure reducing valve 222 is configured to covert the gas pressure to about 0.05 MPa. The electromagnetic valve 223 is connected to an input end of the fuel cell stack 200.

The charging unit 3 is formed by a charging opening 31, a buffer chamber 33 and a one-way valve 32, which are connected in sequence.

The tail exhaust unit 300 mainly includes an electromagnetic valve 301 and a tail exhaust pipe 302 which are interconnected. The electromagnetic valve 301 is further connected to an output end of the fuel cell stack 200. When the electromagnetic valve 301 is in an open state, the tail exhaust pipe 302 is in communication with the inside of the fuel cell stack 200. When the fuel cell stack 200 is in a working state, the electromagnetic valve 301 may open or close at regular time, so as to ensure that the gas inside the fuel cell stack 200 is evenly exhausted while exhausting water. In addition, in some cold areas, the tail exhaust unit 300 may further include a heating and heat preservation unit, to prevent ice blockage at an outlet of the tail exhaust pipe. In this embodiment, apart from the electromagnetic valve 301 and the tail exhaust pipe 302, the heating and heat preservation unit in the tail exhaust unit 300 includes a heat preservation sleeve 303 and a heater 304.

Here, an introduction focuses on the system monitoring unit and the hydrogen supply monitoring unit 6:

A control part of the system monitoring unit is a central processing unit (Central Processing Unit, CPU), and may be logically divided into a hydrogen supply control unit 5, a fuel cell control unit, a water and heat control unit, and an air supply control unit, which are configured to control the hydrogen supply system 100, the fuel cell stack 200, the air supply unit and the water and heat management unit, respectively.

The hydrogen supply control unit 5 is an important constituent part of the hydrogen supply monitoring unit 6. In addition, in this embodiment, the hydrogen supply monitoring unit 6 further includes a detection unit, an execution unit, an onsite emergency response unit, an onsite alarming unit and a remote communication alarming unit.

The detection unit at least includes one of a pressure sensor, a temperature sensor and a hydrogen gas concentration sensor. In this embodiment, the detection unit includes a pressure sensor 41, a pressure gauge 42, a thermometer 43 and a temperature sensor 44 that are disposed on the high pressure busbar 12 (because the high pressure busbar 12 is in communication with the hydrogen storage container 13, a pressure and temperature in the high pressure busbar 12 is a pressure and temperature in the hydrogen storage container 13), a pressure sensor 45 disposed between a second-stage pressure reducing valve 222 and an electromagnetic valve 223, and a hydrogen gas concentration sensor. A setting position and the number of the hydrogen concentration sensor are not fixed, the hydrogen concentration sensor may be disposed on the high pressure busbar 12, near the fuel cell stack 200 or other places where gas leak is likely to occur, and definitely, the hydrogen gas concentration sensor may be mounted at each place where the gas leak is likely to occur. In this embodiment, the hydrogen gas concentration sensor is disposed on the high pressure busbar 12 (not shown). The temperature sensor 501 mounted on the heat preservation sleeve 303 belongs to the administrative range of the previous water and heat control unit.

For example, the onsite alarming unit is an audible and visual alarm, and the remote communication alarming unit is a wireless terminal.

The onsite emergency response unit includes a fan (namely, the emergency ventilation apparatus), a pressure relief valve 81 mounted on the high pressure busbar 12 and an escape pipe 82 connected to the pressure relief valve 81, as well as a pressure relief valve 83 and an escape pipe 84 that are disposed after the first-stage pressure relief valve 214. The pressure relief valve and the escape pipe work in coordination and can release gas when the pressure exceeds a normal range, so as to protect the device.

A working principle of each part is described as follows:

States of the entire hydrogen supply system 100 may be divided into a standby state, a running state and an infusing state.

Any pressure sensor and hydrogen gas concentration sensor, which are at a working state, perform self-detection at an interval of a preset time, and send a detection signal to the CPU through the execution unit. Once a fault is detected, the CPU starts the audible and visual alarm through the execution unit to produce an alarm, and notifies the maintenance center or the maintenance personnel of the alarming situation through the wireless terminal. The maintenance personnel set out for maintenance. Content of the alarming situation notification may be "pressure sensor fault" and "hydrogen gas concentration sensor fault", and so on. In addition, when the execution unit sends the detection signal to the CPU, a number and an address of the above sensor may be carried, so that the CPU or the maintenance personnel determines the specific sensor that has the fault conveniently.

Regardless of the state of the hydrogen supply system 100, the pressure sensor 41 and the hydrogen gas concentration sensor are at the working state constantly.

When a value collected by the pressure sensor 41 is lower than a preset threshold (in this embodiment, the preset threshold is 3 MPa), the CPU starts the wireless terminal to perform alarming situation notification, and starts, through the execution unit, the audible and visual alarm to produce an alarm. In addition, during performing the alarming situation notification, an alarming situation where a pressure value is less than 3 MPa but greater than or equal to 1 MPa is set to an ordinary state, and an alarming situation where a pressure value is less than 1 MPa is set to an emergent state, so that the maintenance personnel make corresponding processing conveniently according to different alarming situation states. When the hydrogen supply system 100 is at a standby state and does not perform infusion, if a value collected by the pressure sensor 41 is greater than a maximum pressure limiting value (in this embodiment, the preset threshold is 13 MPa), the CPU starts the wireless terminal to perform alarming situation notification, and starts, through the execution unit, the audible and visual alarm to produce an alarm. During performing the alarming situation notification, when the pressure value is greater than 13 MPa but less than or equal to 20 MPa, the alarming situation may be set to an ordinary state; when the pressure value is greater than 20 MPa, the alarming situation is set to an emergent state, so that the maintenance personnel make corresponding processing according to different alarming situation states conveniently. In addition, when the alarming situation is in an ordinary and/or emergent state, the pressure relief valve 81 may be started through the execution unit, so as to release high-pressure gas.

When a value collected by the hydrogen gas concentration sensor is greater than a preset threshold (in this embodiment, the preset threshold is 1%), the CPU starts, through the execution unit, the audible and visual alarm and the fan, and starts the wireless terminal to perform alarming situation notification. During performing the alarming situation notification, when the hydrogen gas concentration is greater than or equal to 1% but less than 4%, an alarming situation may be set to an ordinary state; when the hydrogen gas concentration is greater than 4%, the alarming situation is set to an emergent state, so that the maintenance personnel make corresponding processing conveniently according to different alarming situation states. For example, when the alarming situation is in an ordinary state, the maintenance personnel first perform concentration monitoring. After the emergency ventilation apparatus is started for certain time and the concentration decreases to a safe range, the emergency ventilation apparatus is closed. If a value detected by the hydrogen gas concentration sensor indicates that the hydrogen gas concentration stops rising, the maintenance personnel do not need to set out for onsite processing. If the concentration continues rising, which leads to an alarm again, the maintenance personnel need set out for onsite processing. When the alarming situation is in an emergent state, the maintenance personnel set out for onsite processing. In order to further ensure the onsite safety, when the hydrogen supply system 100 is in a running state, the CPU may further close, through the execution unit, the electromagnetic valve 223 or close the electromagnetic valves 221 and 223 at the same time.

Figure 16:
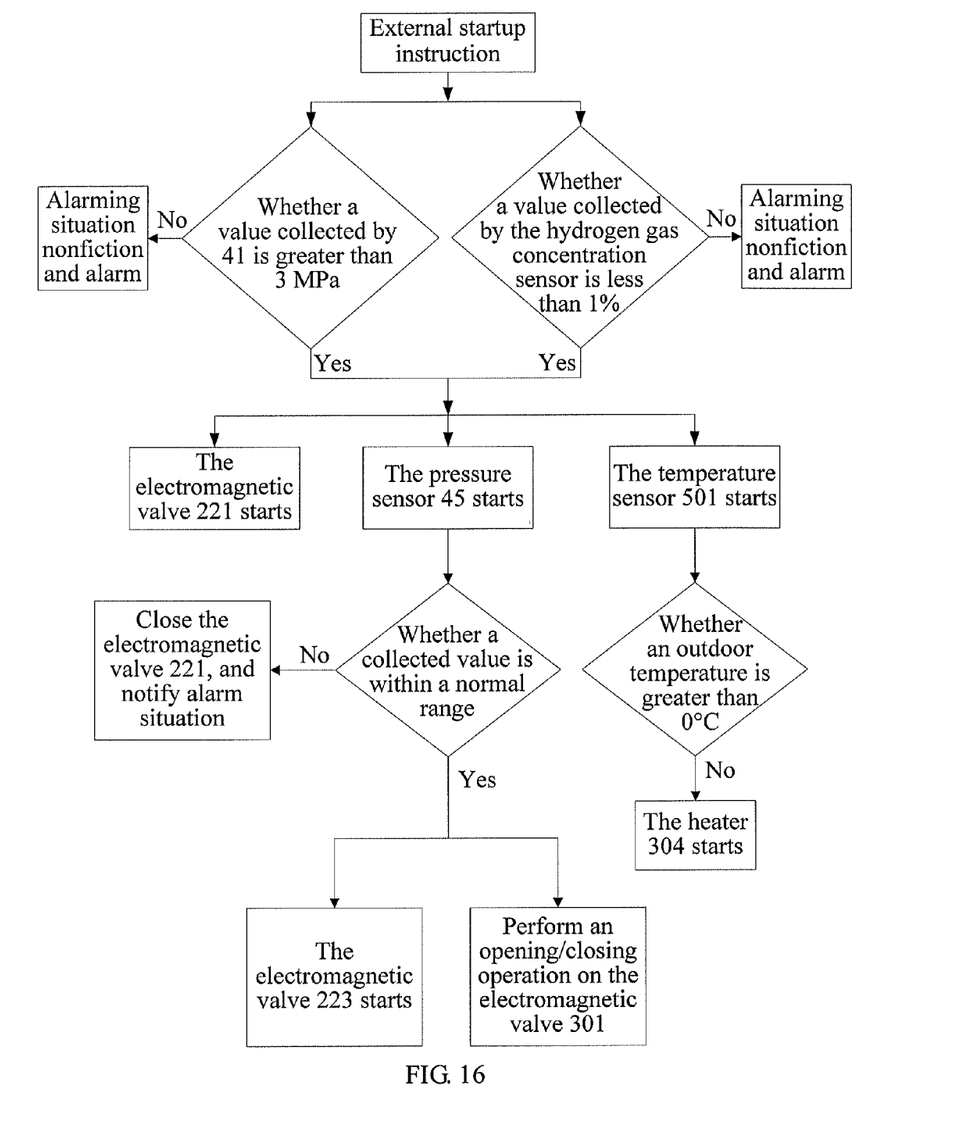
FIG. 16 is a flow chart of startup and running of a hydrogen fuel cell system provided in an embodiment of the present disclosure.

Referring to FIG. 16, when the CPU receives an external startup instruction (the external startup instruction may be from the hybrid power supply system controller that is mentioned previously, or generated when operating personnel manually start the hydrogen fuel cell system), the CPU sends an instruction to the execution unit, and starts the electromagnetic valve 221 and the pressure sensor 45 when the value collected by the pressure sensor 41 is greater than the above preset threshold 3 MPa and the value collected by the hydrogen gas concentration sensor is less than the preset threshold 1%. Otherwise, the CPU controls the wireless terminal to perform alarming situation notification, and instructs the execution unit to control the audible and visual alarm to produce an alarm.

While starting the electromagnetic valve 221 and the pressure sensor 45, the CPU starts the temperature sensor 501, and when the temperature sensor 501 detects that an outdoor temperature is less than or equal to 0° C., controls the heater 304 so that the heater 304 starts. When the value collected by the pressure sensor 45 is in a normal range (0.03 to 0.07 MPa), the CPU starts the electromagnetic valve 223 through the execution unit, and performs an opening/closing operation on the electromagnetic valve 301. In this embodiment, the opening/closing operation on the electromagnetic valve 301 includes: opening the electromagnetic valve 301 at an interval of $\Delta t$ seconds, and when opening time reaches a preset duration $\Delta t'$, closing the electromagnetic valve 301, where $\Delta t$ (s)=75–60 ($P_{output}/P_{max}$), $\Delta t'$ (ms)=800($P_{output}/P_{max}$), $P_{output}$ indicates output power, and $P_{max}$ indicates maximum power.

When the value collected by the pressure sensor 45 is higher than a preset threshold (the preset threshold may be equal to or less than a maximum pressure value that can be borne by the second-stage pressure reducing valve 222, and is 0.07 MPa in this embodiment) or lower than another preset threshold (0.03 MPa in this embodiment), the CPU closes the electromagnetic valve 221 through the execution unit, and starts the wireless terminal to perform alarming situation notification. In other embodiments of the present disclosure, if the value collected by the pressure sensor 45 is higher than a preset threshold or lower than another preset threshold when the hydrogen supply system is in the running state, the electromagnetic valve 221 and the electromagnetic valve 223 may be closed at the same time through the execution unit.

When receiving an external standby instruction, the CPU instructs the execution unit to close all administrated electromagnetic valves and all the detection devices except the pressure sensor 41 and the hydrogen gas concentration sensor.

As for the hydrogen gas infusion, it is suggested that the infusion operation should be performed when the hydrogen fuel cell system is in a standby state. In special cases, the infusion may be performed when the system is in a working state. That is, an infusion state is a special state, and may coexist with other states. In the specific implementation, switch facilities such as a press key or press button may be disposed in the communication base station. The infusion personnel need to press the press key or press button before infusion, so as to instruct the CPU to enter an infusion state. Alternatively, an inductor may be disposed at the charging opening 31. After the infusing gun is inserted into the charging opening 31 at a preset depth, the inductor is triggered, and sends a triggering signal to the CPU through the execution unit, so as to instruct the CPU to enter the infusion state.

During the infusing process, the temperature sensor 44 is constantly in a working state, and when a temperature value collected by the temperature sensor 44 is greater than 80° C., the CPU starts the audible and visual alarm to produce an alarm through the execution unit, and specific content of the alarm may be that "the temperature is too high, please suspend infusion". When the pressure value collected by the pressure sensor 41 is equal to or greater than the maximum pressure limiting value 13 MPa, the CPU starts the audible and visual alarm to produce an alarm, and specific content thereof may be that "the pressure reaches a maximum limiting value" or "infusion is completed".

It should be noted that, the CPU may directly control the temperature sensor 501, the heater 304 and the electromagnetic valve 301, or may adopt a manner similar to the one for controlling the electromagnetic valve 221, that is, the control is implemented indirectly through the execution device, which is not described here again.

The hydrogen supply system in all the above embodiments, the hydrogen fuel cell system including the hydrogen supply system according to any one of the above embodiments, and the system for supplying hydrogen gas mainly formed by the hydrogen supply system and hydrogen gas infusing unit disclosed by any one of the above embodiments all fall within the protection scope of the present disclosure. Apart from being applied to the communication base station, each of the above systems may also be applied to fields such as automobile driving and portable power source system.

In the communication base station application, the hydrogen supply system is generally mounted in unattended outdoor base stations, and the hydrogen supply system is disposed in a separate room with good ventilation in most cases. In order to reduce costs, generally no hydrogen gas sensor is mounted in the hydrogen supply system (definitely, the hydrogen gas concentration sensor has to be mounted in the hydrogen fuel cell system), while in the automobile driving application, multiple hydrogen gas sensors need to be mounted to ensure safety. For the automobile driving and the portable power source system, more factors need to be considered, for example, higher requirements on shake-proof property, impact-proof property, sealing and connector of pipelines and components.

In addition, in aspects of leak prevention and leak processing, when the above systems are applied to the automobile driving, insulation of the hydrogen supply system from a passenger compartment and fast dilution after leak need to be fully considered. Meanwhile, in narrow space in an automobile, shake-proof property and anti-static property of the hydrogen supply pipelines and components, distances and insulation of the pipelines from mechanical parts and electronic components in the automobile need to be further considered.

Correspondingly, an embodiment of the present disclosure further provides a method for supplying hydrogen gas. The method is based on the hydrogen supply systems mentioned in all the above embodiments, and the step of the method at least includes:

infusing hydrogen gas to the hydrogen supply system by using an external infusing device.

Multiple hydrogen supply systems may exist. When the hydrogen supply system needs hydrogen gas supplement, the hydrogen gas infusing unit moves to a place where the hydrogen supply system is located to infuse hydrogen gas.

The embodiments in the specification are described in a progressive manner, and focus of description in each embodiment is the difference from other embodiments. For same or similar parts of each embodiment, reference may be made to each other. Because the method disclosed in the embodiment is corresponding to the apparatus disclosed in the embodiment, the description of the method is simple. For related parts, reference may be made to the description of the apparatus.

Persons skilled in the art should understand that all or a part of the processes of the method according to the embodiments of the present disclosure may be implemented by a program instructing relevant hardware. The program may be stored in a computer readable storage medium. When the program is run, the processes of the method according to the embodiments of the present disclosure are performed. The storage medium may be a magnetic disk, an optical disk, a read-only memory (Read-Only Memory, ROM) or a random access memory (Random Access Memory, RAM).

Based on the description of disclosed embodiments, persons skilled in the art can implement or apply the present disclosure. Various modifications of the embodiments are apparent to persons skilled in the art, and general principles defined in the specification can be implemented in other embodiments without departing from the spirit or scope of the present disclosure. Therefore, the present disclosure is not limited to the embodiments in the specification, but intends to cover the most extensive scope consistent with the principle and the novel features disclosed in the specification.

What is claimed is:

1. A hydrogen supply system, comprising:
one or more hydrogen storage units for storing hydrogen gas;
a high pressure bus bar directly connected through respective passage lines to respective one or more hydrogen storage units without passing through a valve in each of the respective passage lines, wherein the high pressure bus bar comprises an electromagnetic valve disposed on one end to serve as a common opening to the one or more hydrogen storage units;
a hydrogen conveying unit connected to the electromagnetic valve disposed on the one end of the high pressure bus bar to receive hydrogen gas from the one or more storage units to supply hydrogen gas to a hydrogen consumption device; and
a charging device that recharges hydrogen gas to the one or more hydrogen storage units through a direct connection to the electromagnetic valve disposed on the one end of the high pressure bus bar, wherein the charging device comprises a charging opening to match with an external infusing device of a separate external hydrogen gas supply unit that recharges hydrogen gas to the one or more hydrogen storage units.

2. The system according to claim 1, further comprising a one-way valve connecting the charging device and the one or more hydrogen storage units, wherein the one-way valve conducts along a direction from the charging device to the one or more hydrogen storage units.

3. The system according to claim 2, wherein the charging device further comprises a buffer chamber in communication with the charging opening, and the buffer chamber is connected to the one-way valve.

4. The system according to claim 3, wherein the one or more hydrogen storage units comprise one or more hydrogen storage containers, and the one-way valve is connected to the one or more hydrogen storage containers.

5. The system according to claim 4, wherein the hydrogen storage unit further comprises a high pressure busbar in communication with the hydrogen storage container, and the one-way valve is connected to the hydrogen storage container through the high pressure busbar.

6. The system according to claim 5, further comprising a hydrogen supply monitoring unit coupled to the high pressure bus bar, wherein the hydrogen supply monitoring unit comprises a detection unit and a hydrogen supply control unit, and the hydrogen supply control unit sends a corresponding control command according to a received external command or detection data of the detection unit.

7. The system according to claim 6, wherein the hydrogen supply monitoring unit further comprises an execution unit, and the execution unit sends, according to the corresponding control command, a control command to a unit or device administrated by the execution unit.

8. The system according to claim 7, wherein the hydrogen supply monitoring unit further comprises at least one of an onsite alarming unit, an onsite emergency response unit and a remote communication alarming unit, wherein:
when the onsite alarming unit exists, the hydrogen supply control unit comprises an alarming control subunit which is used for controlling the onsite alarming unit so that the onsite alarming unit performs alarming;
when the onsite emergency response unit exists, the hydrogen supply control unit comprises an emergency control subunit which is used for controlling the onsite emergency response unit so that the onsite emergency response unit performs emergency response; and
when the remote communication alarming unit exists, the hydrogen supply control unit comprises a remote communication control subunit which is used for controlling the remote communication alarming unit so that the remote communication alarming unit sends an alarming situation notification.

9. A hydrogen fuel cell system, comprising a hydrogen supply system, wherein the hydrogen supply system comprises one or more hydrogen storage units for storing hydrogen gas, a hydrogen conveying unit, and a charging device connected to the one or more hydrogen storage units, wherein:
a high pressure bus bar is directly connected through respective passage lines to respective one or more hydrogen storage units without passing through a valve in each of the respective passage lines, wherein the high pressure bus bar comprises an electromagnetic valve disposed on one end to serve as a common opening to the one or more hydrogen storage units;
the hydrogen conveying unit connected to the electromagnetic valve disposed on the one end of the high pressure bus bar to receive hydrogen gas from the one or more storage units to supply hydrogen gas to a hydrogen fuel cell; and
the charging device recharges hydrogen gas to the one or more hydrogen storage units through a direct connection to the electromagnetic valve disposed on the one end of the high pressure bus bar, wherein the charging device comprises a charging opening to match with an external infusing device of a separate external hydrogen gas supply unit for recharging hydrogen gas to the one or more hydrogen storage units.

* * * * *